US008132221B2

United States Patent
Malik

(10) Patent No.: US 8,132,221 B2
(45) Date of Patent: Mar. 6, 2012

(54) METHODS, COMPUTER PROGRAM PRODUCTS, AND SYSTEMS FOR PACKAGING LIVECAST ELECTRONIC CONTENT FOR DISTRIBUTION

(75) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 668 days.

(21) Appl. No.: 11/941,114

(22) Filed: Nov. 16, 2007

(65) Prior Publication Data

US 2009/0133080 A1 May 21, 2009

(51) Int. Cl.
*H04N 7/173* (2011.01)
(52) U.S. Cl. ............. 725/116; 725/93; 725/97; 709/219
(58) Field of Classification Search ............ 725/86–104, 725/105–120; 709/217–231
See application file for complete search history.

(56) References Cited

U.S. PATENT DOCUMENTS

| 7,167,895 | B1 * | 1/2007 | Connelly ...................... 709/203 |
| 7,185,352 | B2 * | 2/2007 | Hallford et al. ................. 725/28 |
| 7,472,197 | B2 * | 12/2008 | Li et al. ......................... 709/231 |
| 7,657,912 | B2 * | 2/2010 | Zhao et al. ...................... 725/93 |
| 7,975,282 | B2 * | 7/2011 | Deshpande et al. ............. 725/93 |
| 2007/0140300 | A1 * | 6/2007 | Handekyn et al. ............ 370/486 |
| 2007/0204320 | A1 * | 8/2007 | Wu et al. ....................... 725/135 |
| 2007/0223475 | A1 * | 9/2007 | De Vleeschauwer et al. ............................. 370/390 |
| 2008/0022321 | A1 * | 1/2008 | Ver Steeg et al. ............... 725/78 |
| 2008/0244658 | A1 * | 10/2008 | Chen .............................. 725/50 |

* cited by examiner

*Primary Examiner* — Annan Shang
(74) *Attorney, Agent, or Firm* — Cantor Colburn LLP

(57) ABSTRACT

Packaging live broadcast electronic content for delivery on a content delivery network is provided. A first live program broadcast on a first channel is scheduled for delivery on a livecast channel, and a second live program broadcast on a second channel is scheduled for delivery on the livecast channel. The first live program is associated with a first content identifier and the first channel in an electronic program guide, and the second live program is associated with a second content identifier and the second channel in the electronic program guide. Upon receiving a program selection of at least one of the first live program or the second live program from the electronic program guide, the program selection is delivered over the livecast channel.

17 Claims, 2 Drawing Sheets

METHODS, COMPUTER PROGRAM PRODUCTS, AND SYSTEMS FOR PACKAGING LIVECAST ELECTRONIC CONTENT FOR DISTRIBUTION

TECHNICAL FIELD

Exemplary embodiments relate generally to electronic content distribution and, more specifically, to methods, computer program products, and systems for packaging livecast electronic content for distribution.

BACKGROUND

Electronic content may include live programs delivered substantially in real time, as well as programs delivered in a time-shifted manner on demand. For example, a typical internet protocol television (IPTV) system may offer a multiplicity of real time broadcast channels such as CBS, NBC, ABC, PBS, and Fox, as well as a number of channels offering movies or other programming on request. Typically, viewers watch certain types of programming offered by a real time broadcast channel in real time, such as sporting events and the evening news, whereas other types of programming, such as situation comedies and crime dramas, may be viewed in a time-shifted manner after a live broadcast has occurred.

In the case of time-shifted programming, viewer demand is widely distributed as a function of time. On the other hand, a relatively large number of viewers may wish to simultaneously access a live program feed. The differing nature of live versus on-demand programming imposes differing loads on the various components of a content delivery network. Live programming places a heavy load on the content delivery network, as a separate internet protocol (IP) stream needs to be provided for each live program delivered on each of a plurality of broadcast channels. Although the overall capacity of the content delivery network must be designed to meet the peak demands of live programming, this may require the use of an undesirably large number of routers. Many of these routers will remain unused when live broadcasts are not being viewed, thus resulting in an inefficient content delivery network. Accordingly, what is needed is an improved technique for delivery of live programming that places reduced demands on the content delivery network relative to existing approaches.

SUMMARY

Exemplary embodiments relate to methods, computer program products, and systems for packaging live broadcast electronic content for delivery on a content delivery network. According to the methods, a first live program broadcast on a first channel is scheduled for delivery on a livecast channel, and a second live program broadcast on a second channel is scheduled for delivery on the livecast channel. The first live program is associated with a first content identifier and the first channel in an electronic program guide, and the second live program is associated with a second content identifier and the second channel in the electronic program guide. Upon receiving a program selection of at least one of the first live program or the second live program from the electronic program guide, the program selection is delivered over the livecast channel.

Another set of exemplary embodiments include computer program products for packaging live broadcast electronic content for delivery on a content delivery network. The computer program products include a storage medium readable by a processing circuit and storing instructions for execution by the processing circuit for facilitating a method. The method includes scheduling a first live program broadcast on a first channel for delivery on a livecast channel, and scheduling a second live program broadcast on a second channel for delivery on the livecast channel. The first live program is associated with a first content identifier and the first channel in an electronic program guide, and the second live program is associated with a second content identifier and the second channel in the electronic program guide. Upon receiving a program selection of at least one of the first live program or the second live program from the electronic program guide, the program selection is delivered over the livecast channel.

Another set of exemplary embodiments include systems for packaging live broadcast electronic content for delivery on a content delivery network. The systems include a processing mechanism for scheduling a first live program broadcast on a first channel for delivery on a livecast channel, and for scheduling a second live program broadcast on a second channel for delivery on the livecast channel. The processing mechanism is operatively coupled to a storage mechanism for storing an electronic program guide that associates the first live program with the first channel and a first content identifier, and that associates the second live program with the second channel and a second content identifier. The processing mechanism is coupled to an input/output mechanism for displaying the electronic program guide, and for accepting a program selection from the electronic program guide. The processing mechanism is operatively coupled to a content delivery mechanism. Upon receiving a program selection of at least one of the first live program or the second live program from the electronic program guide, the processing mechanism instructs the content delivery mechanism to deliver the program selection over the livecast channel.

Other methods, computer program products, and apparatuses according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
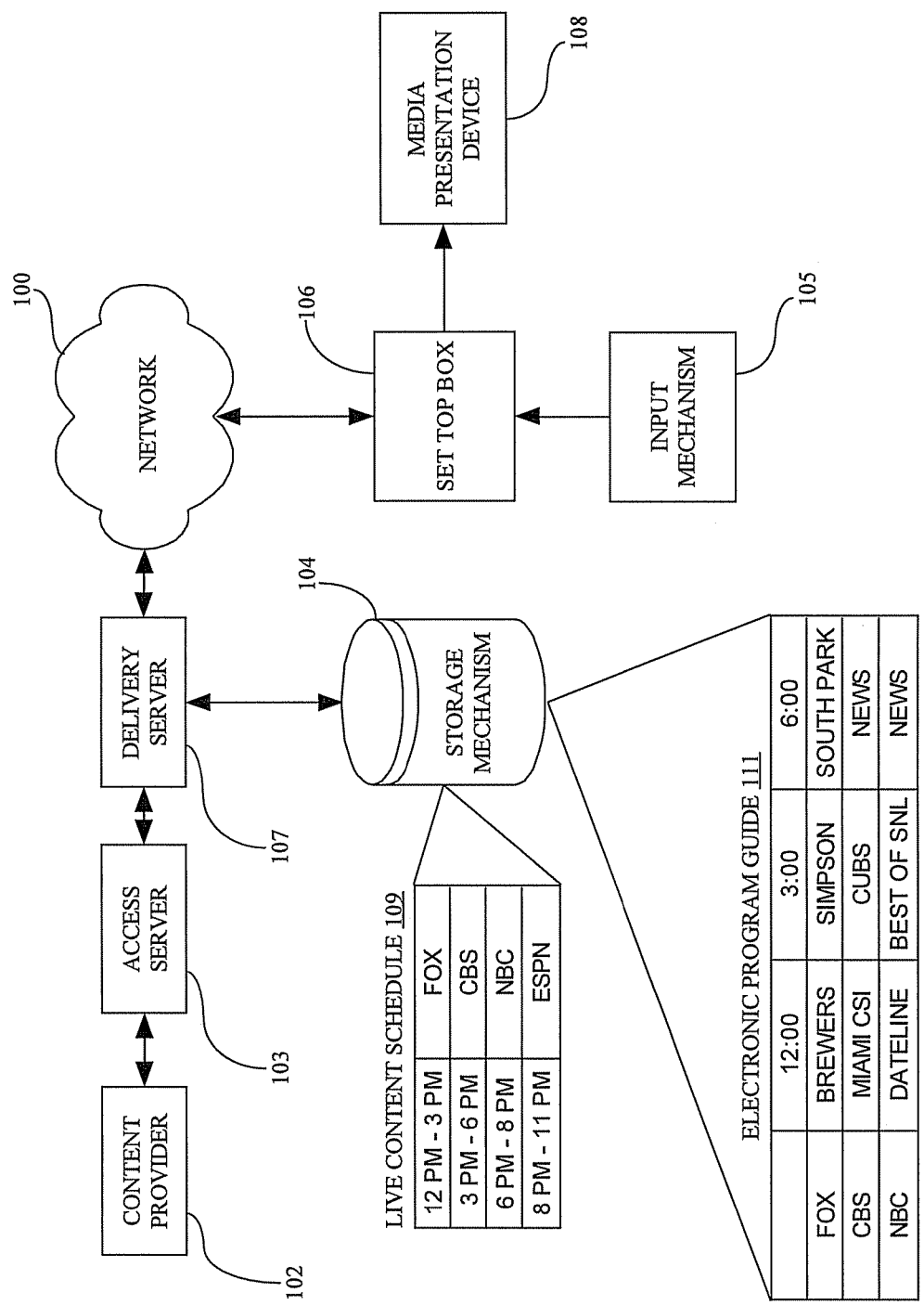
FIG. 1 is a simplified block diagram of an exemplary communication system used to package live broadcast electronic content for delivery on a content delivery network.

FIG. 1 is a simplified block diagram of an exemplary communication system used to package live broadcast electronic content for delivery on a content delivery network. A content provider 102 provides programming that includes one or more live broadcast programs and, optionally, one or more prerecorded programs. The content provider 102 is illustratively implemented using a head end for receiving and processing a plurality of broadcast channels such as CBS, NBC, ABC, FOX, and ESPN to provide program streams for each of the plurality of broadcast channels. The content provider 102 is operatively coupled to an access server 103 for accessing one or more program streams and providing these streams to a delivery server 107. The delivery server 107 and the access server 103 are shown for illustrative purposes, it being clearly understood that a single server or processing mechanism may be employed to implement the delivery server 107 and the access server 103. Alternatively or additionally, the delivery server 107 or the access server 103, or both, may be implemented using a plurality of servers or processing mechanisms.

According to exemplary embodiments, the system of FIG. 1 includes a processing mechanism for scheduling a first live program broadcast on a first channel for delivery on a livecast channel, and for scheduling a second live program broadcast on a second channel for delivery on the livecast channel. This processing mechanism may be provided by the delivery server 107 or the access server 103 or both. In accordance with exemplary embodiments, the livecast channel is designated specifically for carrying live broadcasts from the delivery server 107 to a set top box 106 over a network 100. One purpose of the livecast channel is to reduce the overall hardware requirements for the system of FIG. 1.

The livecast channel is used to sequentially broadcast a plurality of scheduled live programs obtained from a plurality of channels offered by the content provider 102. Illustratively, the live programs are scheduled by the delivery server 107. According to exemplary embodiments, the delivery server 107 maintains a live content schedule 109 setting forth live content to be broadcast on the livecast channel by associating each of a plurality of time slot identifiers, such as 12:00, 3:00 or 6:00, with a corresponding broadcast channel such as FOX, CBS, NBC, and ESPN. One or more livecast channels may be employed, wherein each livecast channel sequentially broadcasts a plurality of scheduled live programs.

In accordance with exemplary embodiments, the livecast channel is transparent to a user of the set top box 106. When a user of the set top box 106 requests to view a live broadcast on a conventional broadcast channel such as FOX, the set top box 106 may automatically and seamlessly receive the live broadcast over the livecast channel, assuming that the live broadcast has been scheduled for delivery over the livecast channel by the access server 103, the delivery server 107, or both.

The delivery server 107 is operatively coupled to a storage mechanism 104 for storing a first content identifier associated with the first live program, and for storing a second content identifier associated with the second live program, in accordance with exemplary embodiments. The storage mechanism 104 may store an electronic program guide 111 associating the first live program with the first channel, and associating the second live program with the second channel. The storage mechanism 104 may also store a live content schedule 109.

The delivery server 107 is operatively coupled over the network 100 to the set top box 106. The set top box 106 is operatively coupled to an input/output mechanism for displaying the electronic program guide 111, and for accepting a program selection from the electronic program guide 111. This input/output mechanism may include a media presentation device 108, such as a display screen, as well as an input mechanism 105, such as a keypad, keyboard, touch sensitive screen, voice recognition software, or the like. According to exemplary embodiments, the delivery server 107 is operatively coupled to the content provider 102 through the access server 103. Upon receiving a program selection of at least one of the first live program or the second live program from the electronic program guide 111, the delivery server 107 may instruct at least one of the access server 103 or the content provider 102 to deliver the program over the livecast channel.

A non-exhaustive list of examples for the network 100 includes wired or optical networks such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof. The network 100 may include any combination of additional communication devices (not shown) such as gateways, routers, switches, and the like. Additionally or alternatively, the network 100 may include wireless networks such as Direct Sequence-Code Division Multiple Access (DS-CDMA), Global System for Mobile Communications (GSM), North American Digital Cellular (NADC), Time Division Multiple Access (TDMA), Extended-TDMA (E-TDMA), W-CDMA, GPRS, GSM, Enhanced Data for GSM Evolution (EDGE), 3G and 4G communication, wireless local area networks such as 802.11, Bluetooth™, Zigbee™, ultra wideband (UWB), or various combinations thereof.

Figure 2:
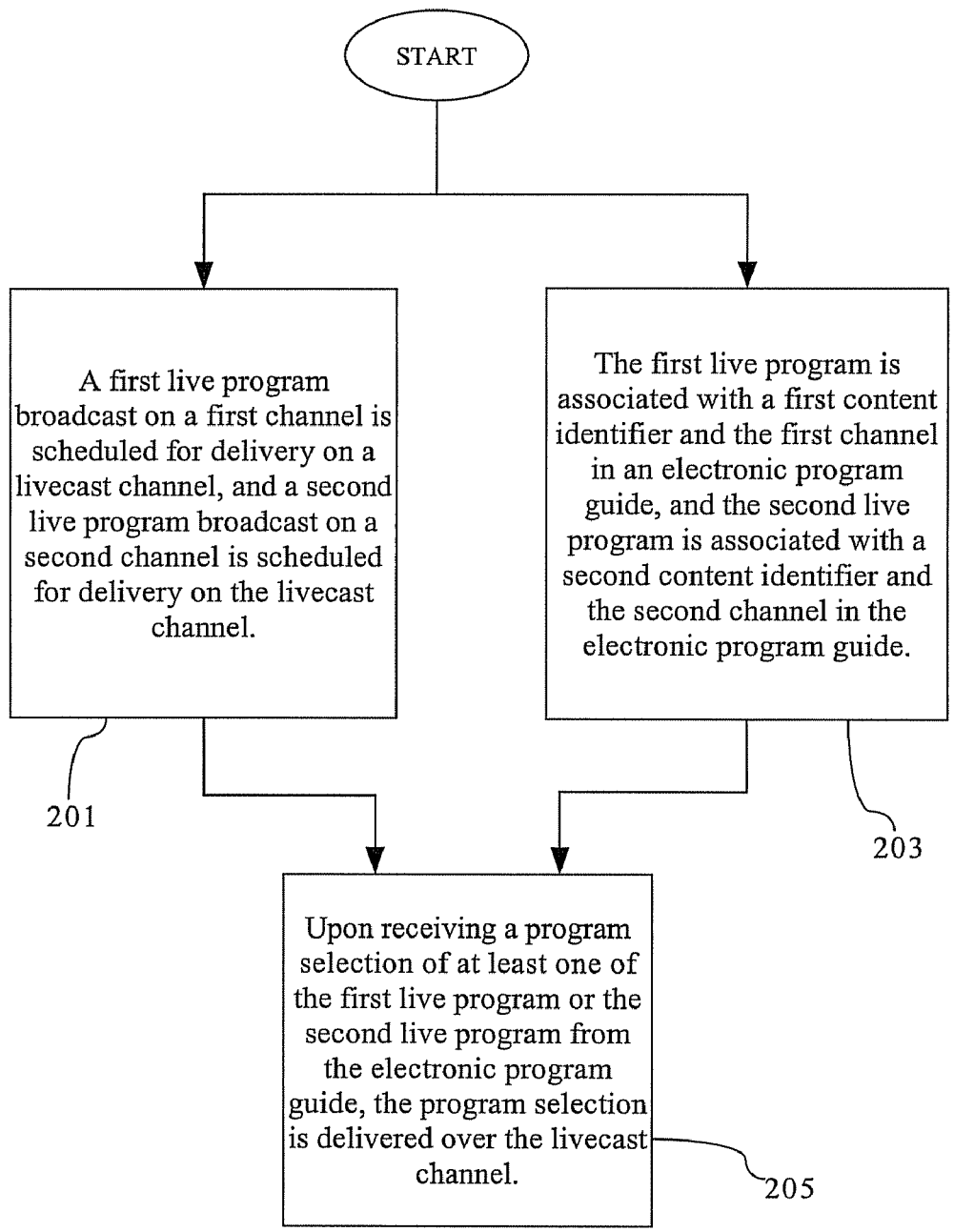
FIG. 2 is a flowchart of an exemplary procedure for packaging live broadcast electronic content for delivery on a content delivery network.

FIG. 2 is a flowchart of an exemplary procedure for packaging live broadcast electronic content for delivery on a content delivery network. The procedure commences at block 201 where a first live program broadcast on a first channel is scheduled for delivery on a livecast channel, and a second live program broadcast on a second channel is scheduled for delivery on the livecast channel. Selecting live programs to be delivered on the livecast channel could, but need not, be performed by identifying a plurality of live programs, such as sporting events or news programs, that are expected or predicted to be widely viewed relative to other programs offered by the first channel, the second channel, or all available channels. Illustratively, block 201 is performed by the delivery server 107 (FIG. 1), the access server 103, or both.

Blocks 201 and 203 (FIG. 2) may be performed simultaneously or in any order. At block 203, the first live program is associated with a first content identifier and the first channel in the electronic program guide 111 (FIG. 1), and the second live program is associated with a second content identifier and the second channel in the electronic program guide 111. For example, the first live program could be associated with a first content identifier in the form of "BREWERS", referring to a Milwaukee Brewers baseball game starting at 12:00 noon on a first channel designated as FOX. The second live program could be associated with a second content identifier in the form of "CUBS", referring to a Chicago Cubs baseball game starting at 3:00 PM on a second channel designated as CBS. Illustratively, the operations of block 203 (FIG. 2) are performed by the delivery server 107 (FIG. 1), the access server 103, or both.

Next, at block 205 (FIG. 2), upon receiving a program selection of at least one of the first live program or the second live program from the electronic program guide 111 (FIG. 1), the program selection is delivered over the livecast channel. The operations of block 205 (FIG. 2) may be performed, for example, by the media presentation device 108 displaying the electronic program guide 111 (FIG. 1) and the input mechanism 105 receiving a user input selecting one or more of the programs listed on the electronic program guide 111. The program selection is received by the set top box 106, transmitted over the network 100, and received by the delivery server 107. The delivery server 107 then requests delivery of the program selection from the access server 103 or the content provider 102 or both.

Preferably, the livecast channel is transparent to a user of the set top box 106. When a user of the set top box 106 requests to view a live broadcast on a conventional broadcast channel such as FOX, the set top box 106 will automatically and seamlessly receive the live broadcast over the livecast channel in a manner transparent to the user, assuming that the live broadcast has been scheduled for delivery over the livecast channel by the access server 103, the delivery server 107, or both.

The procedure of FIG. 2 is advantageous in that it reduces the number or quantity of delivery servers (i.,e., the delivery server 107, FIG. 1) required to deliver broadcast programming in a given internet protocol television (IPTV) or other program delivery system relative to a system that does not use a livecast channel. Practically speaking, approximately 99% of all media is expected to be viewed in a time-shifted manner on a typical IPTV system. As more and more live content is offered by a system, greater amounts of live content can be aggregated and packed together on the livecast channel, thereby reducing the cost and complexity of the IPTV system.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for packaging livecast electronic content for distribution, the method including:
    designating a livecast channel for carrying live broadcasts from a content source;
    scheduling a first live program broadcast on a first channel for delivery on the livecast channel separate from the first channel, and scheduling a second live program broadcast on a second channel for delivery on the livecast channel separate from the second channel, wherein selection of the first live program broadcast and the second live program broadcast being based on a prediction that the first live program broadcast and the second live program broadcast will be viewed live relative to other programs broadcast on other channels to be viewed in a time-shifted manner;
    associating the first live program with a first content identifier and the first channel in an electronic program guide, and associating the second live program with a second content identifier and the second channel in the electronic program guide; and
    upon receiving a program selection of the first live program from the electronic program guide, delivering the program selection over the livecast channel.

2. The method of claim 1 wherein the first live program and the second live program are selected by selecting news programs.

3. The method of claim 1 wherein the scheduling and the associating are performed by a delivery server.

4. The method of claim 1 wherein the delivering of the program selection over the livecast channel is transparent to a user selecting the program selection.

5. The method of claim 4 for use with a set top box wherein, in response to a user of the set top box requesting to view a live broadcast on a conventional broadcast channel, the set top box uses the electronic program guide to automatically receive the live broadcast over the livecast channel in a manner transparent to the user.

6. The method of claim 1 further including using the livecast channel to reduce a number delivery servers required to deliver broadcast programming in an internet protocol television delivery system.

7. A computer program product for packaging livecast electronic content for distribution, the computer program product including a storage medium readable by a processing circuit and storing instructions for execution by the processing circuit for facilitating a method comprising:
    designating a livecast channel for carrying live broadcasts from a content source:
    scheduling a first live program broadcast on a first channel for delivery on a livecast channel separate from the first channel, and scheduling a second live program broadcast on a second channel for delivery on the livecast channel separate from the second channel, wherein selection of the first live program broadcast and the second live program broadcast being based on a prediction that the first live program broadcast and the second live program broadcast will be viewed live relative to other programs broadcast on other channels to be viewed in a time-shifted manner;
    associating the first live program with a first content identifier and the first channel in an electronic program guide, and associating the second live program with a second content identifier and the second channel in the electronic program guide; and
    upon receiving a program selection of the first live program from the electronic program guide, delivering the program selection over the livecast channel.

8. The computer program product of claim 7 wherein the first live program and the second live program are selected by selecting news programs.

9. The computer program product of claim 7 wherein the scheduling and the associating are performed by a delivery server.

10. The computer program product of claim 7 wherein the delivering of the program selection over the livecast channel is transparent to a user selecting the program selection.

11. The computer program product of claim 10 for use with a set top box wherein, in response to a user of the set top box requesting to view a live broadcast on a conventional broadcast channel, the set top box uses the electronic program guide to automatically receive the live broadcast over the livecast channel in a manner transparent to the user.

12. The computer program product of claim 7 further including instructions for using the livecast channel to reduce a number of delivery servers required to deliver broadcast programming in an internet protocol television delivery system.

13. A system for packaging livecast electronic content for distribution, the system including:
a processing mechanism for designating a livecast channel for carrying live broadcasts from a content source and scheduling a first live program broadcast on a first channel for delivery on a livecast channel separate from the first channel, and for scheduling a second live program broadcast on a second channel for delivery on the livecast channel separate from the second channel, wherein selection of the first live program broadcast and the second live program broadcast being based on a prediction that the first live program broadcast and the second live program broadcast will be viewed live relative to other programs broadcast on other channels to be viewed in a time-shifted manner;
a storage mechanism, operatively coupled to the processing mechanism, for storing an electronic program guide that associates the first live program with the first channel and a first content identifier, and that associates the second live program with the second channel and a second content identifier;
an input/output mechanism, operatively coupled to the processing mechanism, for displaying the electronic program guide, and for accepting a program selection from the electronic program guide;
a content delivery mechanism, operatively coupled to the processing mechanism, wherein upon receiving a program selection of the first live program from the electronic program guide, the processing mechanism instructs the content delivery mechanism to deliver the program selection over the livecast channel.

14. The system of claim 13 wherein the first live program and the second live program are selected by selecting news programs.

15. The system of claim 13 wherein the scheduling and the associating are performed by a delivery server.

16. The system of claim 13 wherein the delivering of the program selection over the livecast channel is transparent to a user selecting the program selection, the system further comprising a set top box operatively coupled to the processing mechanism over a network, the set top box operatively coupled to the input/output mechanism wherein, in response to a user of the set top box requesting to view a live broadcast on a conventional broadcast channel, the set top box uses the electronic program guide to automatically receive the live broadcast over the livecast channel in a manner transparent to the user.

17. The system of claim 13 wherein the livecast channel reduces a number of delivery servers required to deliver broadcast programming in an internet protocol television delivery system relative to a system that does not use the livecast channel.

* * * * *